United States Patent [19]

Fenn et al.

[11] Patent Number: 5,314,045
[45] Date of Patent: May 24, 1994

[54] FLUID CONNECTING ASSEMBLY

[75] Inventors: Gerald Fenn, Pfersdorf; Robert Pradel, Röthlein-Heidenfeld, both of Fed. Rep. of Germany

[73] Assignee: Fichtel & Sachs AG, Schweinfurt, Fed. Rep. of Germany

[21] Appl. No.: 998,873

[22] Filed: Dec. 29, 1992

Related U.S. Application Data

[63] Continuation of Ser. No. 694,653, May 2, 1991, abandoned.

[30] Foreign Application Priority Data

May 7, 1990 [DE] Fed. Rep. of Germany ....... 4014469

[51] Int. Cl.$^5$ ................................. H16F 9/43
[52] U.S. Cl. .................. 188/322.21; 267/64.28
[58] Field of Search ............... 267/64.11, 64.28; 188/313, 318, 322.16, 322.17, 322.18, 322.19, 322.21; 285/96, 190, 197; 92/163

[56] References Cited

U.S. PATENT DOCUMENTS

| 3,446,318 | 5/1969 | Duckett | 188/322.17 |
| 3,729,030 | 4/1973 | Brissenden | 285/96 |
| 3,963,227 | 6/1976 | Mölders | 267/120 |
| 4,257,580 | 3/1991 | Schnitzius | 267/64.28 |
| 4,858,964 | 8/1989 | Usui | 285/197 |
| 4,878,419 | 11/1989 | Vick | 92/163 |

FOREIGN PATENT DOCUMENTS

| 1555436 | 7/1963 | Fed. Rep. of Germany . |
| 1505280 | 9/1964 | Fed. Rep. of Germany . |
| 3319742 | 12/1984 | Fed. Rep. of Germany . |
| 3630152 | 3/1988 | Fed. Rep. of Germany . |
| 3925519 | 2/1992 | Fed. Rep. of Germany . |
| 0069339 | 5/1980 | Japan ................ 267/64.28 |
| 0046135 | 4/1981 | Japan ................ 188/322.21 |
| 790109 | 5/1958 | United Kingdom . |
| 845533 | 8/1960 | United Kingdom . |
| 1234017 | 6/1971 | United Kingdom . |
| 1313069 | 4/1973 | United Kingdom . |
| 2032554 | 5/1980 | United Kingdom . |

*Primary Examiner*—Robert J. Oberleitner
*Assistant Examiner*—Chris Schwartz
*Attorney, Agent, or Firm*—Brumbaugh, Graves, Donohue & Raymond

[57] ABSTRACT

According to an illustrative example of the invention a connecting pipe is provided with a cover face engaging an external cylindrical face of a cylinder. This cylinder includes a fluid chamber and is provided with a bore through the cylindrical face. The cover face is provided with a three-dimensionally formed groove surrounding the bore. A sealing ring is accomodated with the groove. The cover face is pressed against the cylindrical face via a clamping band so that the sealing ring is under prestress.

10 Claims, 6 Drawing Sheets

0
FLUID CONNECTING ASSEMBLY

This application is a continuation of application Ser. No. 07/694,653, filed on May 2, 1991, now abandoned.

BACKGROUND OF THE INVENTION

The invention relates to a fluid connecting assembly with a connecting unit on a cylindrical face of a fluidic pneumatic, hydraulic or hydropneumatic unit, in particular a pneumatic spring of a spring cylinder or of an oscillation damper, through which connecting unit gaseous or liquid medium is supplied to a chamber or discharged from a chamber of said pneumatic, hydraulic or hydropneumatic unit, said connecting unit cooperating with a bore in said cylindrical face.

Statement of the prior art

Connecting pipes are usually fastened in a cylindrical part by brazing or welding. Such a heat treatment of the cylindrical part is disadvantageous, particularly if the cylindrical part is constructed as a cylinder in which a piston slides as the cylinder tends to become distorted owing to the heat treatment. In particular with brazing, scale is formed at the brazing point so that the tightness cannot be guaranteed with total reliability despite the very expensive procedure. Furthermore, touching up is often necessary to eliminate the deformations produced by the heat treatment. In a further known embodiment, the connecting pipe is screwed into a plane connecting part, provided specifically for this purpose, of the cylinder tube. A very expensive measure is also required for this purpose in order either to provide the cylinder tube with a plane face in the region of the screw-in point or to provide this face by means of a flange-like part rigidly connected to the cylinder tube.

Object of the invention

The object of the present invention is to fasten a connecting pipe to a cylinder wall in a constructionally simple manner without a heat treatment while permitting unproblematic fitting even after a surface treatment preferably serving for corrosion prevention.

SUMMARY OF THE INVENTION

A fluid connecting assembly comprises a connecting unit on a cylindrical face of a fluidic unit, i.e., a pneumatic, hydraulic or hydropneumatic unit, in particular a pneumatic spring of a spring cylinder or of an oscillation damper. Through this connecting unit gaseous or liquid medium is supplied to a chamber or discharged from a chamber of said pneumatic, hydraulic or hydropneumatic unit. The connecting unit cooperates with a bore in said cylindrical face and has a cover face or surface adapted to said cylindrical face. Sealing means are arranged between said cylindrical face and said connecting unit and are pretensioned radially with respect to said cylindrical face.

For example, this connecting member cover surface can also be formed by the internal face of a container tube of a twin tube oscillation damper or a pneumatic spring. A connecting assembly of the invention is advantageous, in particular, for the oil leakage return line of a spring cylinder, as this connecting assembly has a small radial dimension, for example owing to an angular shape, and consequently also demands a small radial space. For this purpose, a bore or opening is drilled in the cylinder tube in the region of an oil leakage chamber arranged between the piston rod seal and an oil leakage wiping seal and is provided with the connecting unit. The connecting unit may be connected via an oil leakage line to a reservoir.

A very advantageous embodiment is obtained if, according to a further optional feature of the invention, in the region of the bore in the cylinder the connecting unit has the cover face formed with a three dimensionally curved groove in which a sealing element, preferably in the form of an O-ring, is received, said groove surrounding said bore. At least one clamping band surrounding the cylinder and the connecting unit may be used for pretensioning the sealing means through said connecting unit against said cylindrical face. The clamping band may be formed by a single lug clamping ring. According to a further embodiment a ring (annular) member of said connecting unit surrounds a cylinder provided with said cylindrical face and defines a sealed annular chamber around said cylinder into which annular chamber said bore leads. Said cover face is in such case an annular cover face and said sealing means comprise two annular sealing members surrounding said cylinder on both sides of said bore. According to a still further embodiment the connecting unit possesses resilient tongues which extend through said bore and grip behind a further face of the cylinder spaced from said cylindrical face.

A particularly inexpensive embodiment is obtained if the connecting unit consists of plastics material.

The cover face and the receiving means therein for said sealing means may be formed by non-cutting shaping.

The various features of novelty which characterize the invention are pointed out with particularity in the claims annexed to and forming a part of the disclosure. For a better understanding of the invention, and the its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 1:
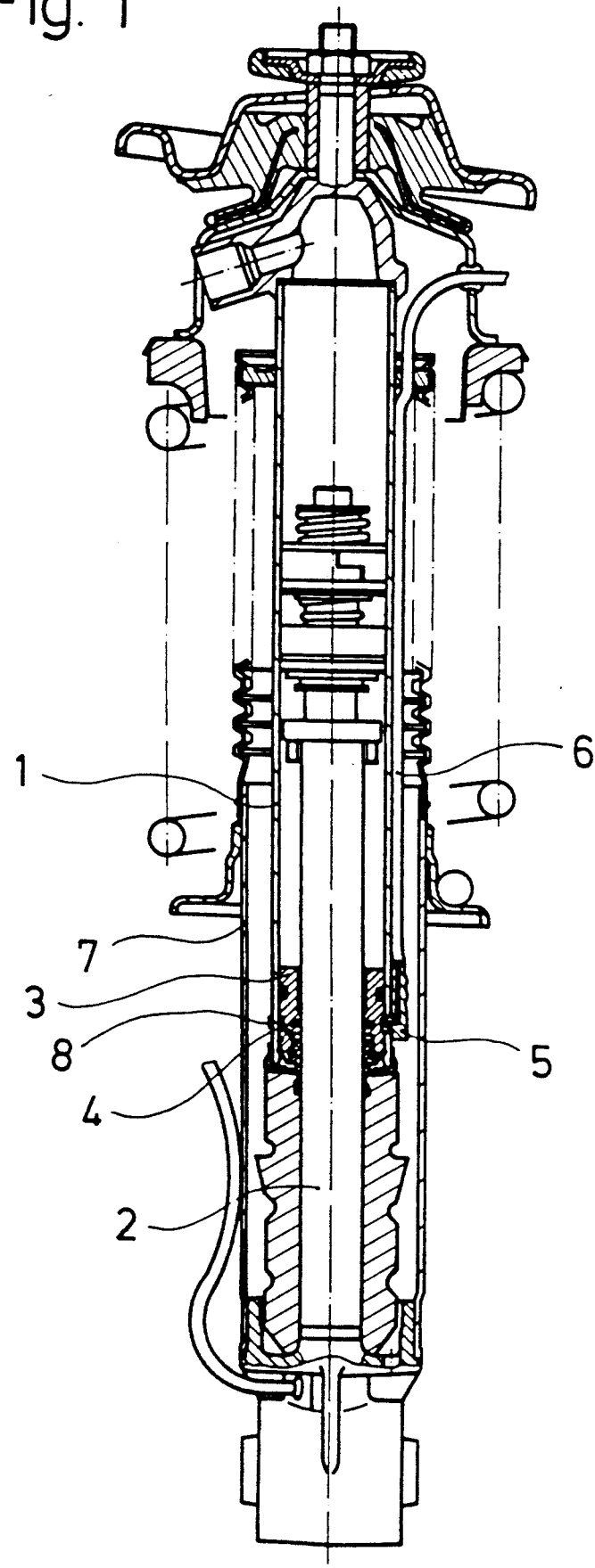
FIG. 1 shows a spring cylinder with oil leakage return line in a longitudinal section.

FIG. 1 shows a spring cylinder which has an oil leakage return line and a downwardly issuing piston rod 2, and the interior of the cylinder 1 is partially filled with damping fluid which can be supplied and discharged via a separate connecting sleeve. A connecting unit 5 which is connected to an oil leakage line 6 is provided in the region of a piston rod guide 3 fastened at the piston rod outlet end of the cylinder 1. An oil leakage chamber 10 (see FIG. 2) into which the connecting unit 5 opens is provided axially outwardly of a piston rod seal 4 located in the piston rod guide 3. A clamping band 8 is provided for fastening the connecting unit 5 on the cylinder 1, the connecting unit 5 as well as the oil leakage line 6 being arranged so as to extend in an annular chamber limited by the cylinder 1 and a protective tube 7.

Figure 2:
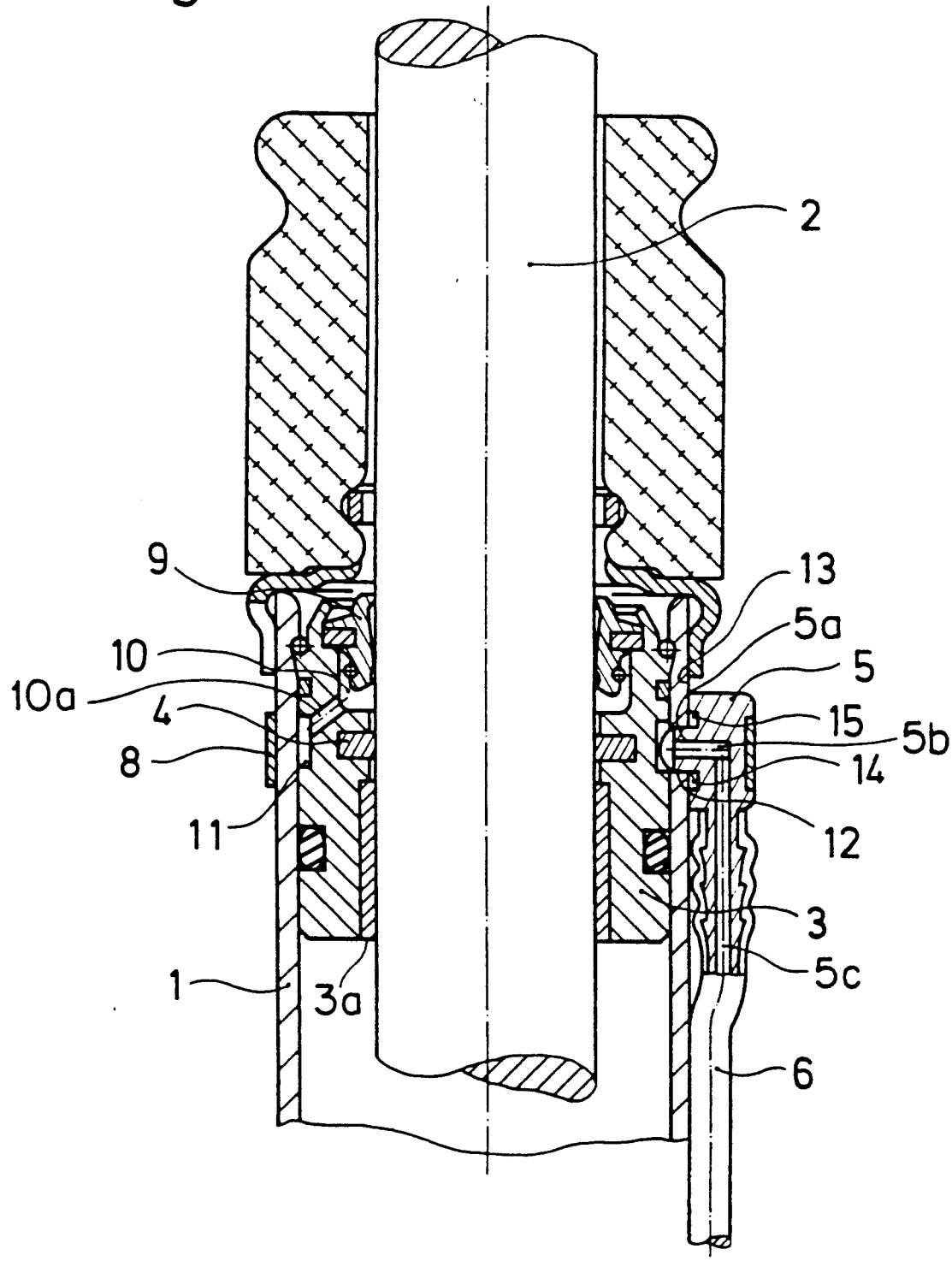
FIG. 2 shows the region of the oil leakage return line in a spring cylinder with an upwardly issuing piston rod.

The oil leakage return line, shown on an enlarged scale in FIG. 2, of the spring cylinder 1 differs from the one shown in FIG. 1 essentially in that the piston rod 2 is arranged so as to issue upwardly. The important details of the oil leakage return line coincide with those according to FIG. 1. Thus, the piston rod guide 3 which is fastened in a sealing manner in the cylinder is provided with a slide bush 3a for the piston rod 2 and carries the piston rod seal 4 in a groove. An oil leakage chamber 10 which communicates via bores 10a with an annular chamber 11, is provided between this piston rod seal 4 and an oil leakage wiping seal 9.

In the region of this annular chamber 11, the cylinder 1 is provided with a bore 12 into which a connecting boss 5a of the connecting unit 5 is guided. Toward the cylinder 1, the connecting unit 5 has a cover face 13 which generally conforms to the external wall of the cylinder 1, i.e., the cover face 13 has a concave, cylindrical contour which generally conforms to the opposed convex, cylindrical surface of the cylinder 1. A three-dimensionally curved groove 15 is provided in the connecting unit 5 for receiving a seal 14 constructed as an O-ring, while a clamping band 8 is provided for pressing against the connecting unit and therefore for pretensioning the seal 14 An absolutely tight connection between the connecting unit 5 and the cylinder 1 is thus created. The leaked oil accumulating between the piston rod seal 4 and the oil leakage wiping seal 9 in the oil leakage chamber 10 can therefore be carried off to the reservoir by the bores 10a leading to the annular chamber 11 and the bores 5b and 5c in the connecting unit 5 as well as the oil leakage line 6.

Figure 3:
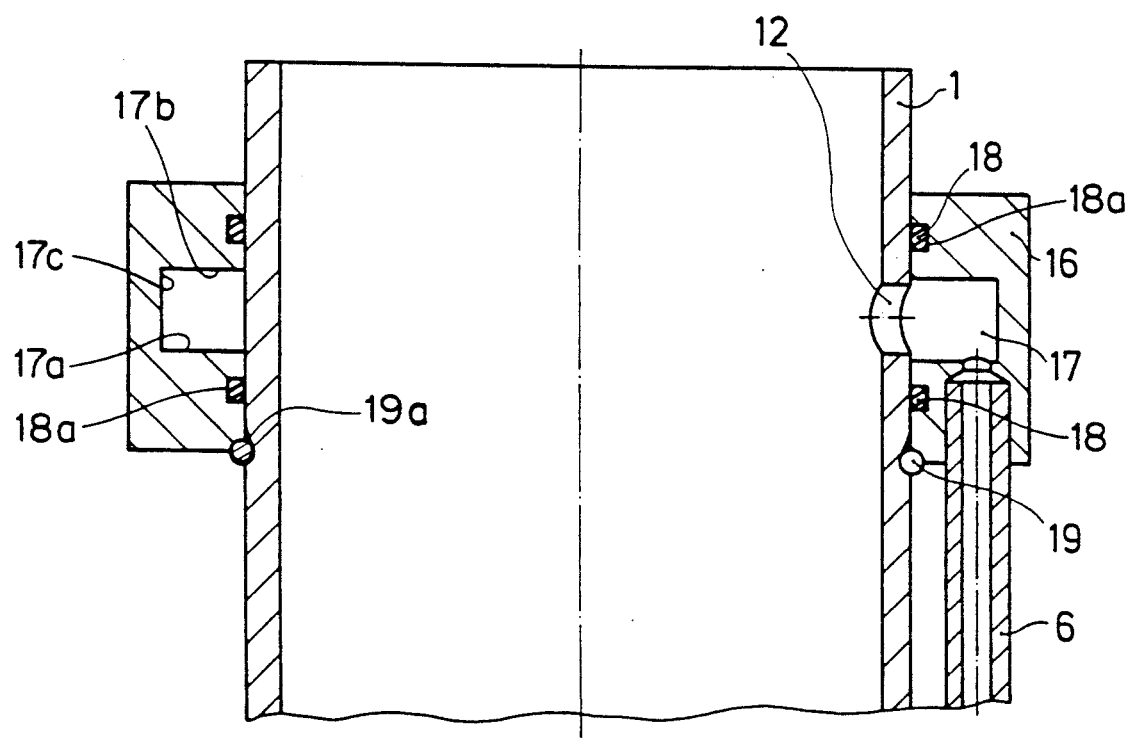
FIG. 3 shows a connecting unit which is constructed as a ring surrounding the cylinder.

FIG. 3 shows a further embodiment of a connecting unit on a cylinder 1, the connecting unit being formed by a ring 16. An annular chamber 17 into which the bore 12 of the cylinder 1 opens is formed in this ring 16, having side walls 17a and 17b and a bottom wall 17c. On either side of the annular chamber 17, sealing rings 18 are provided in grooves 18a of the ring 16 and take over the sealing of the connecting unit constructed as a ring 16 when the ring 16 is pushed over the cylinder 1. A snap ring 19 against which the ring 16 is pressed is provided in a circumferential groove 19a in the cylinder 1 for positioning the ring 16 axially on the cylinder 1. The axial alignment of the bore 12 with the annular chamber 17 is guaranteed in this way. The line 6 through which a medium can be supplied to or discharged from the interior of the cylinder opens into the ring 16.

Figure 4:
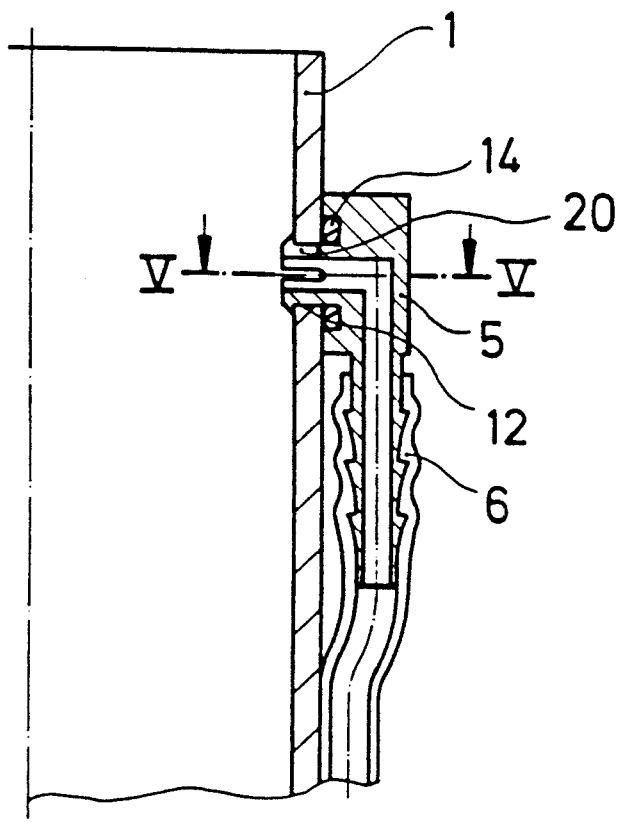
FIG. 4 shows a connecting unit which is fastened to the cylinder by means of resilient tongues, in a longitudinal section.
Figure 5:
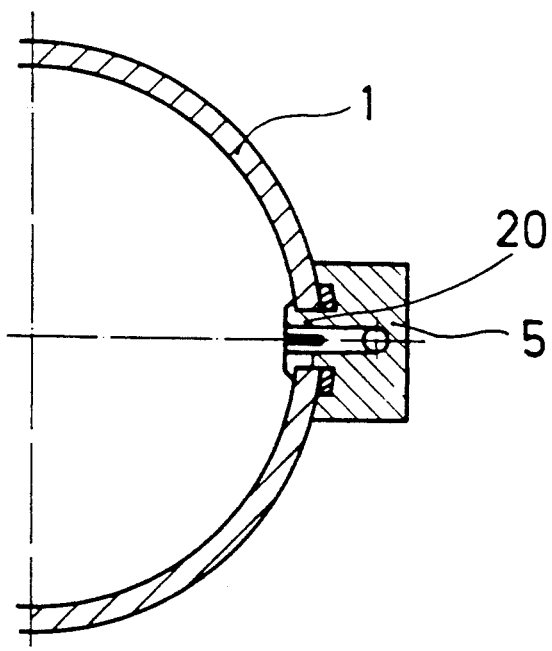
FIG. 5 shows a cross section through the embodiment according to FIG. 4, in cross section.

The embodiment according to FIGS. 4 and 5 differs from that according to FIG. 2 essentially in that the connecting unit 5 is introduced into the bore 12 of the cylinder 1 by resilient tongues 20, and the seal 14 experiences a pretension owing to the application of a radial force. During this contact pressure on the connecting unit 5, cogs on the ends of the resilient tongues 20 extend behind and abut the internal wall of the cylinder 1. The connecting unit 5 is fastened in the cylinder tube 1 very simply in this way.

Figure 6:
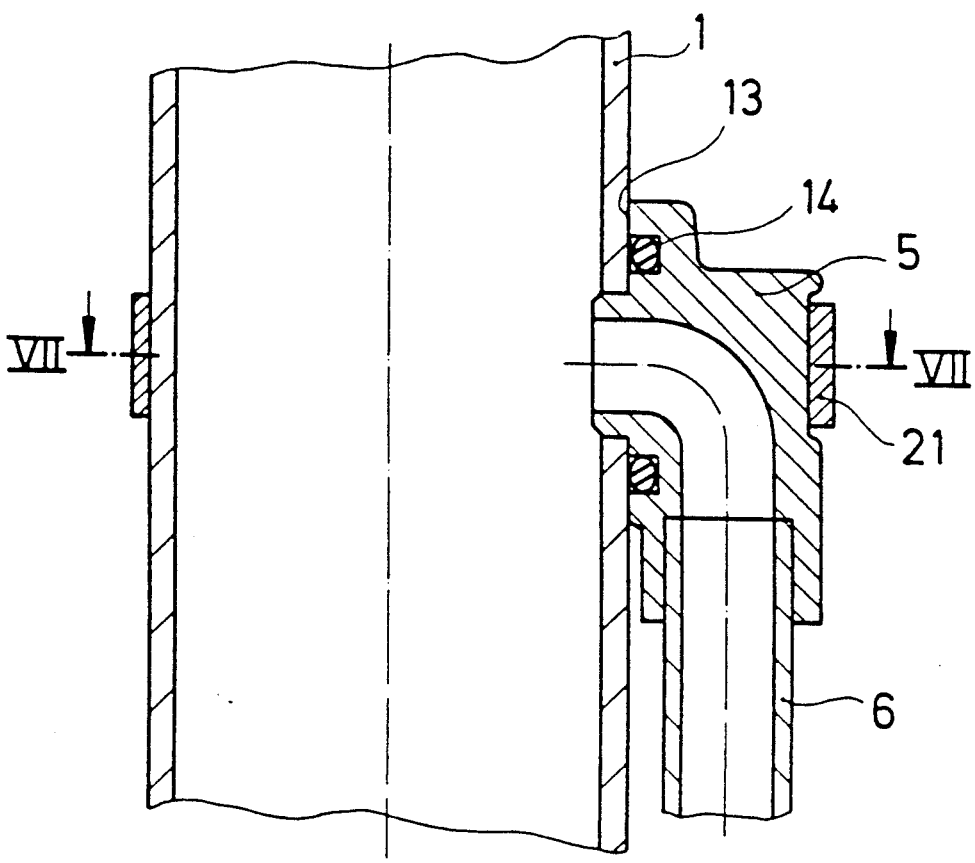
FIG. 6 shows the fastening of another embodiment of the connecting unit to the cylinder, in an enlarged view.
Figure 7:
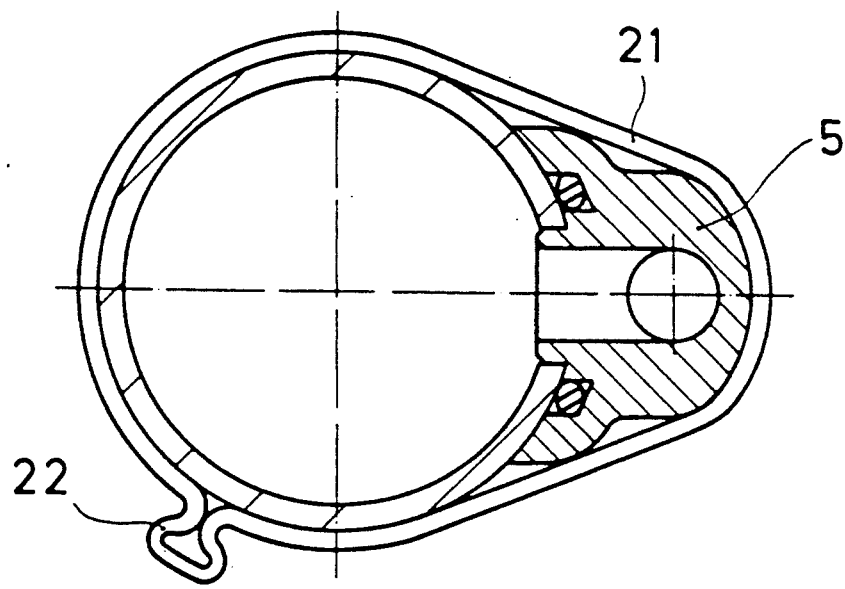
FIG. 7 shows the embodiment according to FIG. 6 in a cross section along section line VII—VII.

FIGS. 6 and 7 show an embodiment for fastening the connecting unit 5 on the cylinder 1, the pretension of the seal 14 and the contact pressure of the coverface 13 on the external wall of the cylinder being produced by a single lug clamping band 21. The necessary circumferential tension in the band 21 is created by the substantially omega-shape of the pressed lug 22. It has been established by experiments that such a fastening of the connecting unit 5 on the cylinder 1 withstands very high pressures. At a temperature of 20° C., such a connection withstands 100 bar internal pressure in the cylinder without difficulty.

Figure 8:
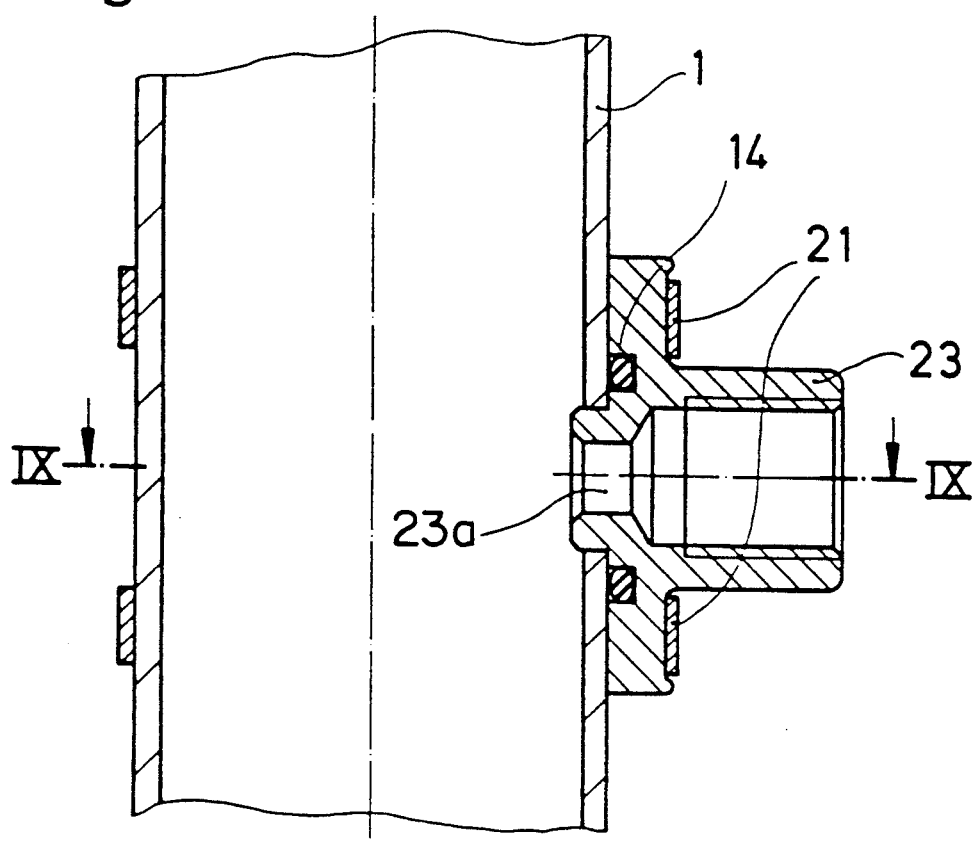
FIG. 8 shows a further embodiment of a connecting unit and the fastening thereof on the cylinder.
Figure 9:
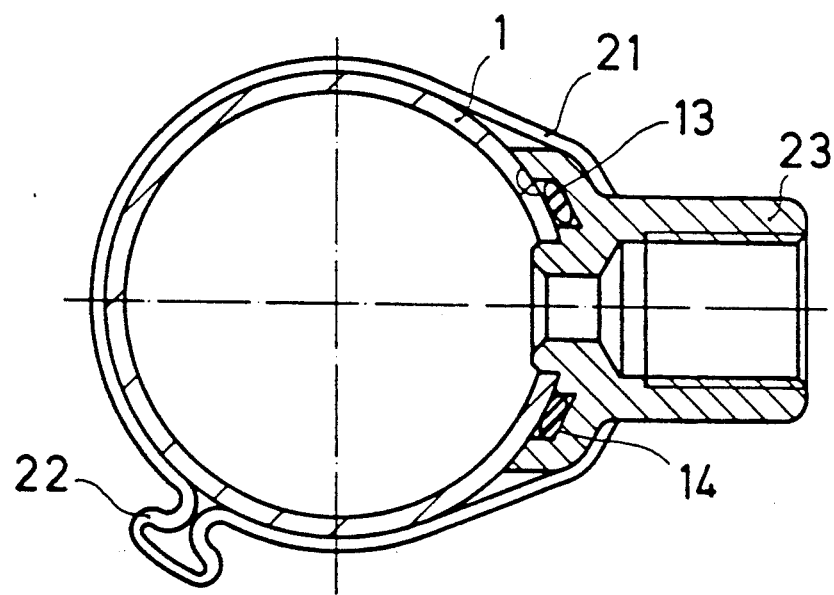
FIG. 9 shows the embodiment according to FIG. 8 in a cross section along the section line IX—IX.

FIGS. 8 and 9 show the fastening of a further connecting unit 23 on the cylinder 1. The inner face 13 of the connecting unit 23 which engages the cylinder 1 is shaped to conform generally to the external wall of the cylinder 1 and has a corresponding groove 15 for the seal 14 For fastening the connecting unit 23 on the cylinder 1, two single lug clamping rings 21 are provided, are on either side of the radial, outwardly directed central bore 23a in the connecting unit 23. Owing to the provision of the lugs 22, the pretension for the seal 14 is achieved and the contact of the connecting unit 23 with the face 13 on the external wall of the cylinder 1 is created. As shown in FIGS. 8 and 9, the central bore 23a is radially aligned with the opening 12 through the wall of the cylinder 1.

The connecting units are advantageously formed by an investment casting or a plastics part, the coverface 13 or the three-dimensionally curved groove 15 adapted to the coverface being molded in and not being subjected to touching up.

Application is not restricted to spring cylinders with an oil leakage return line but can also be used directly for the supply and discharge of a medium which is subjected to high pressure.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A fluid connecting assembly in combination with a piston unit,
   wherein the piston unit comprises a cylinder having a longitudinal axis and defining a cavity therein, the cylinder including two axially spaced end walls, a piston axially moveable in the cavity, a piston rod coupled to the piston and extending axially out of the cavity through at least one of the end walls,
   the cylinder having an external circumferential face about the longitudinal axis, at least a part of the external circumferential face being shaped as a convex, substantially cylindrical face portion about the longitudinal axis, and an opening through the convex cylindrical face portion connecting with the cavity;

wherein the fluid connecting assembly comprises:

a connecting member composed of a plastic material and having a substantially concave face portion against the convex cylindrical face portion of the cylinder and generally conforming in shape therewith, the connecting member having a fluid channel with a first end adjacent the concave face portion in substantial alignment with the opening through the convex cylindrical face portion, and the connecting member having a closed loop groove in the concave face portion around the opening axis;

a closed loop sealing member in the closed loop groove, the closed loop sealing member being in sealing engagement with both the convex cylindrical face portion of the cylinder and the closed loop groove of the connecting member, the concave face portion of the connecting member having a circumferential and axial extent sufficient to enclose the closed-loop groove but extending in circumferential direction over substantially less than the full circumference of the circumferential face;

means for urging the connecting member against the convex cylindrical face portion to radially compress the closed loop sealing member between the closed loop groove and the convex cylindrical face portion, the urging means comprising a plurality of resilient plastic tongues integral with the connecting member and extending radially through the opening in the convex cylindrical face portion and engaging behind an internal surface of the cylinder, the fluid channel being substantially L-shaped within the connecting member, one leg of the L-shaped channel being in substantial alignment with the opening along the opening axis and terminating in the first end, and the other leg of the L-shaped channel begin substantially parallel to the longitudinal axis of the cylinder and terminating in a second end directed substantially parallel to the longitudinal axis; and means for connecting a prolongation tube to the connecting member in fluid connection with the second end of the L-shaped channel.

2. A fluid connecting assembly as set forth in claim 1, wherein the connecting means comprises a connecting tube member integral with the connecting member and extending substantially parallel to the longitudinal axis.

3. A fluid connecting assembly in combination with a piston unit, wherein the piston unit comprises a cylinder having a longitudinal axis and defining a cavity therein, the cylinder including two axially spaced end walls, a piston axially moveable in the cavity, a piston rod coupled to the piston and extending axially out of the cavity through at least one of the end walls, the cylinder having an external circumferntial face about the longitudinal axis, at least a part of the external circumferential face being shaped as a convex, substantially cylindrical face portion about the longitudinal axis, and an opening through the convex cylindrical face portion connecting with the cavity, the opening having an opening axis substantially perpendicular to the longitudinal axis;

wherein the fluid connecting assembly comprises:

a connecting member having a substantially concave face portion against the convex cylindrical face portion of the cylinder and generally conforming in shape therewith, the connecting member having a fluid channel with a first end adjacent the concave face portion in substantial axial alignment with the opening through the convex cylindrical face portion, and the connecting member having a closed loop groove in the concave face portion around the opening axis;

a closed loop sealing member in the closed loop groove, the closed loop sealing member being in sealing engagement with both the convex cylindrical face portion of the cylinder and the closed loop groove of the connecting member, the concave face portion of the connecting member having a circumferential and axial extend sufficient to enclose the closed-loop groove but extending in circumferential direction over substantially less than the full circumference of the circumferential face; and means for urging the connecting member against the convex cylindrical face portion to radially compress the closed loop sealing member between the closed loop groove and the convex cylindrical face portion;

the urging means including a clamping band separate from both the piston unit and the connecting member, the clamping band surrounding both the cylinder and the connecting member and being in substantially radial engagement with the circumferential face of the cylinder outside of the circumferential extent of the connecting member and with a radially outer engagement face of the connecting member substantially opposite the concave circumferential face portion in the direction of the opening axis, the clamping band being free of fluid conducting faces, the clamping band being in substantial alignment with the opening through the convex cylindrical face portion along the opening axis, the fluid channel being substantially L-shaped within the connecting member, one leg of the L-shaped channel begin in substantial alignment with the opening along the opening axis and terminating in the first end, and the other leg of the L-shaped channel being substantially parallel to the longitudinal axis of the cylinder, outside the circumferential face of the cylinder and terminating in a second end directed substantially parallel to the longitudinal axis, and the connecting member having an annular projection adjacent the first end of the fluid channel and around the opening axis and engaging into the opening.

4. A fluid connecting assembly as set forth in claim 3, wherein the urging means comprises means for circumferentially tensioning at least one clamping band.

5. A fluid connecting assembly as set forth in claim 4, wherein the means for circumferentailly tensioning the at least one clamping band comprises a substantially omega-shaped tensioning lug.

6. A fluid connecting assembly as set forth in claim 3, wherein the radially outer engagement face of the connecting member has a generatrix substantially parallel to the longitudinal axis.

7. A fluid connecting assembly as set forth in claim 3, wherein the second end is provided with a connecting means for connection to a tube member.

8. A fluid connecting assembly as set forth in claim 3, wherein the connecting member is shaped at least in the proximity of the convex cylindrical face portion by noncutting shaping.

9. A fluid connecting assembly as set forth in claim 3, wherein the connecting member is made of a plastic material.

10. A fluid connecting assembly as set forth in claim 3, wherein the concave face portion is in pressure contact with the convex cylindrical face portion.

* * * * *

UNITED STATES PATENT AND TRADEMARK OFFICE
CERTIFICATE OF CORRECTION

PATENT NO. : 5,314,045
DATED : May 24, 1994
INVENTOR(S) : Gerald Fenn and Robert Pradel It is certified that error appears in the above-indentified patent and that said Letters Patent is hereby corrected as shown below:

Col. 1, line 9, "fluidic" should read --fluidic unit, i.e., a--;
Col. 2, line 21, "is in" should read --is, in--;
Col. 2, line 22, "case an" should read --case, an--;
Col. 2, line 22, "face and" should read --face, and--;
Col. 2, line 23, "comprise" should read --comprises--;
Col. 2, line 37, "the its" should read --the--;
Col. 3, line 29, "10" should read --10,--;
Col. 4, line 30, "are" should read --one--;
Col. 6, line 15, "extend" should read --extent--;
Col. 6, line 43, "begin" should read --being--.

Signed and Sealed this

Thirteenth Day of December, 1994

Attest:

BRUCE LEHMAN

Attesting Officer

Commissioner of Patents and Trademarks